L. D. RUNDELL.
Car Brake.

No. 59,273.

Patented Oct. 30, 1866.

Witnesses:
John B Facts
Geo W Robbins

Inventor:
L. D. Rundell.

UNITED STATES PATENT OFFICE.

LORENZO D. RUNDELL, OF SOUTH WESTERLO, NEW YORK.

IMPROVEMENT IN CAR-BRAKES.

Specification forming part of Letters Patent No. 59,273, dated October 30, 1866.

*To all whom it may concern:*

Be it known that I, LORENZO D. RUNDELL, of South Westerlo, in the county of Albany and State of New York, have invented, made, and applied to use a certain new and useful Improvement in Compound Pawls for Car-Brakes, &c.; and I do hereby declare the following to be a full, clear, and exact description of the said invention, reference being had to the annexed drawings, making part of this specification, wherein—

Figure 1:
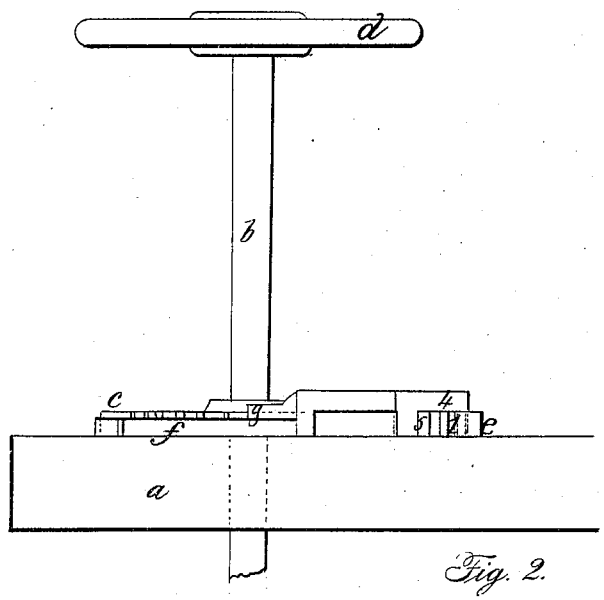
Figure 3:
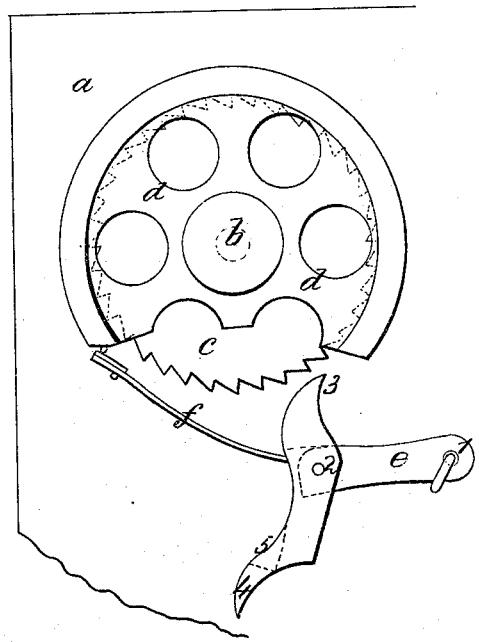
Figure 2:
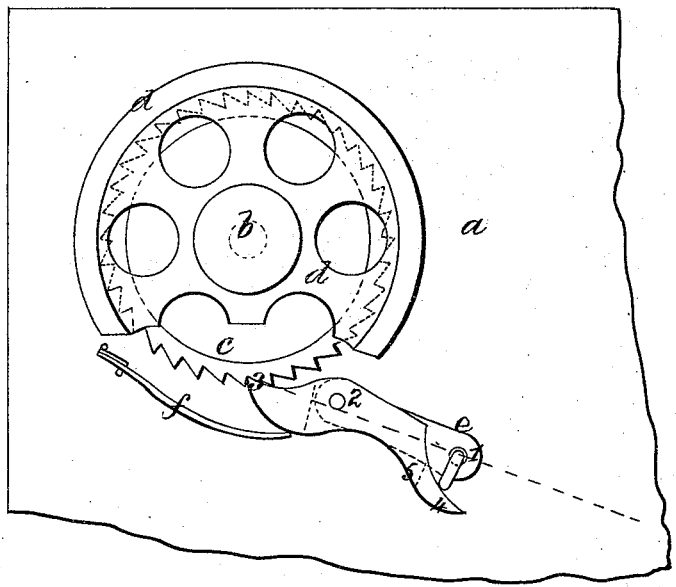

Figure 1 is an elevation of the improved compound pawl as applied to a brake ratchet-wheel. Fig. 2 is a plan of the same in place, a portion of the hand-wheel being removed to show the pawl; and Fig. 3 is a similar plan with the pawl disconnected or turned back.

Similar marks of reference denote the same parts.

In brakes for railroad-cars the strain is often so great, particularly after the car is stopped, that it is with great difficulty that the hand-wheel is sufficiently turned to allow the pawl to be thrown out of the ratchet-teeth.

The present invention is a modification of that for which Letters Patent were granted to me for pawls for hay-presses, dated February 10, 1863, by which the pawl is adapted to be used with the ratchet-wheel on the brakes of cars.

This improvement consists in a compound pawl formed by attaching the lever-pawl to its fulcrum by a link, so that a line from the end of the pawl to the fulcrum passes outside the joint between the pawl and link. Hence the pressure against the end of the pawl keeps it and the link together; but the ratchet-wheel can be released without seizing the brake-wheel by simply moving the pawl so that it turns aside on the joint connecting it with the link, and can be replaced by the foot with facility when the brake is again brought into use.

In the drawings, $a$ represents a portion of the platform of a car or other support for the shaft $b$ and ratchet-wheel $c$ for the brake. $d$ is the brake-wheel, of any usual character. $e$ is the link of my compound pawl, supported by the fulcrum or joint 1, and having a second joint, 2, by which the pawl $i$, with its end 3, and lever 4 are attached. 5 is a stop for preventing the lever end 4 turning too far, in order that the joint 2 may be slightly past a straight line from the end 3 of the pawl $i$ to the fulcrum 1. (See Fig. 2.) Hence the pressure of the ratchet-wheel against the end 3 will keep the block or stop 5 tightly against the side of the link $e$; but when the lever end 4 is moved so that the joint 2 passes the line between the point 3 and fulcrum 1 the pressure of the wheel $c$ throws the parts into the position shown in Fig. 3 and allows the brake to turn back or slacken. $f$ is a spring to throw the pawl into the teeth of the ratchet-wheel $c$.

The lever end 4 can be operated by the foot, or, in case of freight-cars, a cord may be required, so that it may be operated from the side or the top of the car.

It will be evident that if the end of the pawl $i$ is extended, as seen by dotted lines in Fig. 2, it may be used as a common pawl where there is but little pressure on the brake-wheel, the link $e$ and pawl $i$ moving on the fulcrum 1; and this compound pawl, being formed with the lever as a prolongation of the pawl itself, is to be distinguished from those compound pawls for brakes that simply have a hinged end to the pawl that has to be placed by hand, because it has not a lever end that can be moved by the foot.

What I claim, and desire to secure by Letters Patent, is—

The combination of the lever-pawl $i$ and link $e$, when hinged and pivoted as herein described, and arranged in relation to the ratchet-wheel $c$, in the manner and for the purposes herein specified.

In witness whereof I have hereunto set my signature this 18th day of April, A. D. 1866.

L. D. RUNDELL.

Witnesses:
 GEO. W. ROBBINS,
 JOHN B. TAETS.